United States Patent Office 2,887,372
Patented May 19, 1959

2,887,372
LOWER ALKYL ESTERS OF N-FURFURYLTHIOL-CARBAMIC ACID AS COMPOSITIONS AND HERBICIDES

Harry Tilles, El Cerrito, and Joe Antognini, Mountain View, Calif., assignors to Stauffer Chemical Company, a corporation of Delaware No Drawing. Application February 13, 1957
Serial No. 639,855

9 Claims. (Cl. 71—2.5)

This invention relates to certain novel lower alkyl esters of N-furfurylthiolcarbamic acid as compositions of matter and as herbicides. More specifically, the invention relates to compounds of the general formula

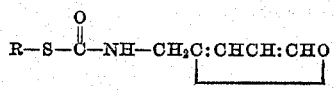

wherein R is a lower alkyl group.
Preferred substituent groups are:

$R_4$
$CH_3$
$C_2H_5$
$n-C_3H_7$
$n-C_4H_9$
$i-C_4H_9$

The novel compounds of the present invention may be made in accordance with the following non-limiting examples. Code numbers have been assigned to each compound and are used throughout the balance of the application.

Example 1.—3.2 g. (0.080 mole) of sodium hydroxide was dissolved in 50 cc. of water and to this solution was added 8.0 g. (0.083 mole) of furfuryl amine and 50 cc. of ethyl ether. The mixture was cooled in an ice bath to 5° C. and then 10 g. (0.080 mole) of ethyl chlorothiolformate was added slowly, keeping the temperature of the reaction mixture at 5–10° C. After the addition was completed, the ether layer was separated from the water phase and was washed with 1–50 cc. portion of dilute hydrochloric acid (3 cc. of concentrated hydrochloric acid diluted to 50 cc. with water) and 1–25 cc. portion of water. It was then dried over anhydrous magnesium sulfate, filtered and the filtrate was concentrated first on the steam bath and finally with the aid of a Rinco Rotating Evaporator. There was obtained as a residue 13.2 g. of ethyl N-furfurylthiolcarbamate, $n_D^{27}$ 1.5320.

Example 2.—When the general procedure of Example 1 was repeated except that 7.2 g. (0.075 mole) of furfuryl amine, 10 g. (0.072 mole) of n-propyl chlorothiolformate and 2.9 g. (0.072 mole) of sodium hydroxide were employed, there was obtained 13 g. of n-propyl N-furfurylthiolcarbamate, $n_D^{27}$ 1.5251.

Example 3.—When the general procedure of Example 1 was repeated except that 6.6 g. (0.068 mole) of furfuryl amine, 10 g. (0.066 mole) of n-butyl chlorothiolformate and 2.6 g. (0.066 mole) of sodium hydroxide were employed, there was obtained 13 g. of n-butyl N-furfurylthiolcarbamate, $n_D^{25}$ 1.5200.

The compounds of the present invention have been tested as herbicides and found very effective as the following typical tests show. Some of the compounds are quite selective in their action and can be used to eradicate or control one type of plant, while another type of plant is relatively unaffected.

In making the following tests, seeds were planted in 3" pots and shortly thereafter the compound under test was applied to the pots as a drench at the rate of 365 pounds per acre. The pots were placed in a greenhouse and watered at suitable intervals and the germination and growth of the seeds was compared with similarly planted seeds to which no herbicide was added. In each case, germination was reported on the scale of 0–100%, while growth was reported on a scale of 0–10, based on the seeds which germinated. Thus, 100–10 indicates normal germination and normal growth.

The following data were obtained:

| Compound | Oats | | Cucumber | | Radish | |
|---|---|---|---|---|---|---|
| | Percent Germ | Growth | Percent Germ | Growth | Percent Germ | Growth |
| R-2084 | 0 | | 0 | | 0 | |
| R-2085 | 0 | | 0 | | 0 | |
| R-2086 | 10 | 2 | 10 | 2 | 0 | |

The compounds of the present invention may be used as preemergence or postemergence herbicides and may be applied in a variety of ways at various concentrations. They may be combined with suitable carriers and applied as dusts, sprays or drenches. The amount applied will depend on the nature of the seeds or plants to be controlled and the rate of application may vary from 1 to 500 pounds per acre. One particularly advantageous way of applying the compounds is as a narrow band along a row crop, straddling the row.

We claim:
1. The chemical compound:

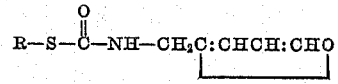

wherein R is a lower alkyl group.
2. The chemical compound ethyl N-furfurylthiolcarbamate.
3. The chemical compound n-propyl N-furfurylthiolcarbamate.
4. The chemical compound n-butyl N-furfurylthiolcarbamate.
5. The method of combatting weeds comprising applying a phytotoxic amount to the soil of the compound

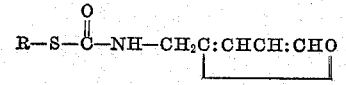

wherein R is a lower alkyl group.
6. The method of claim 5 wherein the compound is applied at a rate of from 1 to 500 pounds per acre.
7. The method of claim 5 wherein the compound is ethyl N-furfurylthiolcarbamate.
8. The method of claim 5 wherein the compound is n-propyl N-furfurylthiolcarbamate.
9. The method of claim 5 wherein the compound is n-butyl N-furfurylthiolcarbamate.

References Cited in the file of this patent

UNITED STATES PATENTS

| 2,744,898 | Harman et al. | May 8, 1956 |
| 2,776,974 | D'Amico et al. | Jan. 8, 1957 |
| 2,804,381 | Garman et al. | Aug. 27, 1957 |